United States Patent
Halsey et al.

(10) Patent No.: US 11,030,855 B1
(45) Date of Patent: Jun. 8, 2021

(54) SENSOR EQUIPPED DEVICE FOR HOLDING AND COUNTING GAMING CHIPS

(71) Applicant: Elevating Gaming Technology, LLC, El Dorado, AR (US)

(72) Inventors: James H. Halsey, El Dorado, AR (US); William L. Evans, El Dorado, AR (US)

(73) Assignee: Elevated Gaming Technology, LLC, Hot Springs, AR (US)

( * ) Notice: Subject to any disclaimer, the term of this patent is extended or adjusted under 35 U.S.C. 154(b) by 0 days.

(21) Appl. No.: 16/133,441

(22) Filed: Sep. 17, 2018

Related U.S. Application Data

(60) Provisional application No. 62/560,012, filed on Sep. 18, 2017, provisional application No. 62/575,030, filed on Oct. 20, 2017.

(51) Int. Cl.
*G07F 17/32* (2006.01)
*G06K 7/10* (2006.01)
*A63F 11/00* (2006.01)

(52) U.S. Cl.
CPC ...... *G07F 17/3248* (2013.01); *A63F 11/0051* (2013.01); *G06K 7/10841* (2013.01); *A63F 11/0002* (2013.01); *A63F 2011/0006* (2013.01); *A63F 2011/0058* (2013.01)

(58) Field of Classification Search
CPC .............. G07F 17/3248; A63F 11/0051; A63F 11/0002; A63F 2011/0058; A63F 2011/0006; G06K 7/10841
See application file for complete search history.

(56) References Cited

U.S. PATENT DOCUMENTS

| | | | |
|---|---|---|---|
| 5,757,876 A | 5/1998 | Dam et al. | |
| 7,491,125 B2 | 2/2009 | Mathis et al. | |
| 7,753,779 B2 | 7/2010 | Shayesteh | |
| 8,668,148 B2 | 3/2014 | Gronau et al. | |
| 9,779,582 B1 | 10/2017 | Ben Hanan et al. | |
| 9,795,870 B2 | 10/2017 | Ratliff | |
| 2006/0019739 A1 | 1/2006 | Soltys et al. | |
| 2007/0184898 A1* | 8/2007 | Miller | G07D 9/002 463/29 |
| 2011/0070943 A1* | 3/2011 | Ratliff | A63F 11/0002 463/25 |

OTHER PUBLICATIONS

Kristen Chonowski, Photoelectric Sensors: The Basics of Through Beam and Diffuse Sensors, Jul. 12, 2016, Arrow.com, available at <<https://www.arrow.com/en/research-and-events/articles/demystify-photo-sensor>>. (Year: 2016).*

* cited by examiner

*Primary Examiner* — Werner G Garner

(57) ABSTRACT

A system useful for recording and monitoring the number of gaming tokens (chips) in a single row of a container (chip tray), in each of the rows of a container, in all of the rows of a container, and/or in each or all rows of all of the containers of a gaming establishment (casino), has a number of measuring infrared sensors removably attached to the container, the measuring sensors and microprocessor determining the number of gaming tokens or sum monetary value of gaming tokens and communicating the number of gaming tokens or their monetary value to a display screen for monitoring by casino personnel.

15 Claims, 5 Drawing Sheets

SENSOR EQUIPPED DEVICE FOR HOLDING AND COUNTING GAMING CHIPS

CROSS-REFERENCE TO RELATED APPLICATIONS

This application claims priority from U.S. provisional patent application no. 62/560,012, filed on Sep. 18, 2017 and entitled "Adjustable Casino Table and Chip Tracking Tray," and U.S. provisional patent application No. 62/575,030, filed on Oct. 20, 2017 and entitled "Device for Holding and Counting Gaming Chips." Such applications are incorporated by reference as if fully set forth herein.

STATEMENT REGARDING FEDERALLY SPONSORED RESEARCH OR DEVELOPMENT

Not applicable.

BACKGROUND OF THE INVENTION

With over 1,000 gaming operations, the United States gaming industry is the largest in the world, bringing in tens of billions of dollars every year. A large segment of the gaming operations raking in this cash is made up of brick-and-mortar casinos. While these casinos have a wide variety of gaming options, some of the most popular games fall into the category of "table games." Table games are characterized as being played on a table and operated by one or more live dealers. Table games include blackjack, poker, roulette, and craps. Table games (and other games across the casino) typically use gaming tokens in lieu of currency. These gaming tokens are typically small round discs and can be made of metal, plastic, or other materials.

These gaming tokens (often referred to as "chips") are interchangeable at casino banks, gaming tables, and cashier stations, where the casino patrons exchange their currency for the chips. While these chips generally do not have any value outside the casino doors, inside the casino they are typically the only currency used. Similar to normal currency, these gaming tokens range in value—from a single dollar chip to chips that represent hundreds of dollars. Given the sheer volume of chips used in casinos and the value assigned to each chip, casino owners must be vigilant in their security.

Despite the security employed by casinos, the temptation for employees and customers to commit crimes remains. The most common security feature in modern day casinos is the use of security cameras above gaming tables. These cameras are used to keep a watchful eye on the tables to determine whether any crimes are being committed. Unfortunately, even when security personnel are actively looking for these crimes, many dealers employed by the casino are capable of concealing their illegal actions, and often times the cameras may not catch that anything nefarious has taken place. As a result, casino employees, and in particular those dealers at live tables, are able to make off with millions of dollars annually.

One known method of criminal activity by table game dealers involves colluding with casino patrons to steal poker chips (and thus money) from casinos. For example, a black jack dealer who has access to hundreds of dollars in chips may inconspicuously hand more chips to his conspirator than the conspirator rightfully won. Alternatively, given the sleight-of-hand skills of many dealers—who must work quickly to deal cards and count and distribute chips—it is possible for many live dealers to inconspicuously move chips into their own pockets. While the cameras may usually catch these criminal actions, many times the dealers get away with their crimes. A new device for assisting casino security personnel with monitoring casino situations, and in particular for assisting with monitoring dealer actions as it relates to the movement of chips, is needed.

BRIEF SUMMARY OF THE INVENTION

This invention relates generally to equipment for monitoring and recording the flux of gaming chips in and out of a gaming table tray. Generally speaking, the present invention is directed to a device, assembly, and system capable of the real-time calculation of the amount and value of gaming chips stowed in a table-top container. In particular, one embodiment of the present invention is directed to an assembly comprising a device utilizing electronic distance measuring equipment attached to a chip tray to create an assembly capable of being utilized to detect, record, and monitor the amount of chips in the chip tray assembly. In one embodiment, a number of measuring devices may be simultaneously attached to the chip tray, the devices being linked together for creating a sum total of contents located in the single gaming/poker chip tray (with each measuring device being capable of measuring the amount of chips in a particular row of the chip tray). In one embodiment, a method for a casino or gaming establishment to monitor play results live or in "real-time" or quickly and precisely inventory gaming chips in that tray is presented, the method utilizing a measuring device and chip tray assembly to record and monitor the amount of chips in the chip tray assembly. In another embodiment, the present invention is directed to a system comprising multiple chip tray and monitoring device assemblies in communication with one another and with a central command computer or server, the system useful for providing a casino or gaming establishment the ability to monitor real-time results of all table games across its entire establishment and selectively monitor or more closely scrutinize a particular table, area, or dealer.

Because of the scenarios in which the assembly, system, and method of the present invention is utilized, it is desired that the present invention provide a device, system, and method that provides an accurate measurement of chip amounts, has a low power requirement, and is not dangerous to the operator or other persons in the area where such device would be used. Finally, in one embodiment, the device, system, and method of the present invention allows for the collection and storage of real-time data pertaining to each hand of play, thus allowing for additional opportunities for data analysis to further identify and thus combat various types of fraud perpetrated against casinos by either or both players and casino employees.

These and other features, objects, and advantages of the present invention will become better understood from a consideration of the following detailed description of the preferred embodiments and appended claims in conjunction with the drawings as described following:

DETAILED DESCRIPTION OF THE INVENTION

This invention relates generally to equipment for monitoring and recording the flux of gaming chips in and out of a gaming table tray and a method for using such equipment. In one embodiment, the present invention generally relates to a device for electronically monitoring the contents of a table top gaming container, the device being connected to a modified chip tray to create a specially manufactured assembly useful for combating crime at casino table games. In another embodiment, the present invention generally relates to a system of tray monitoring device and chip tray assemblies, each of the assemblies capable of monitoring individual gaming tables such that when the assemblies are coupled together, the system is capable of facilitating monitoring of an entire casino establishment from a central command computer or station.

Figure 1:
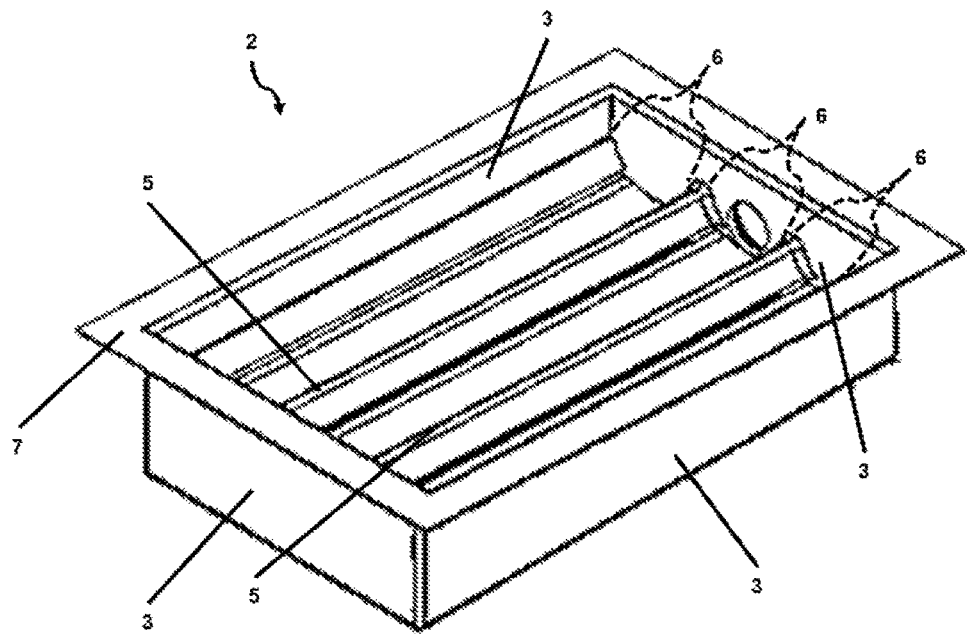
FIG. 1 is a top perspective view of the modified chip tray container according to one implementation of the present invention.
Figure 2:
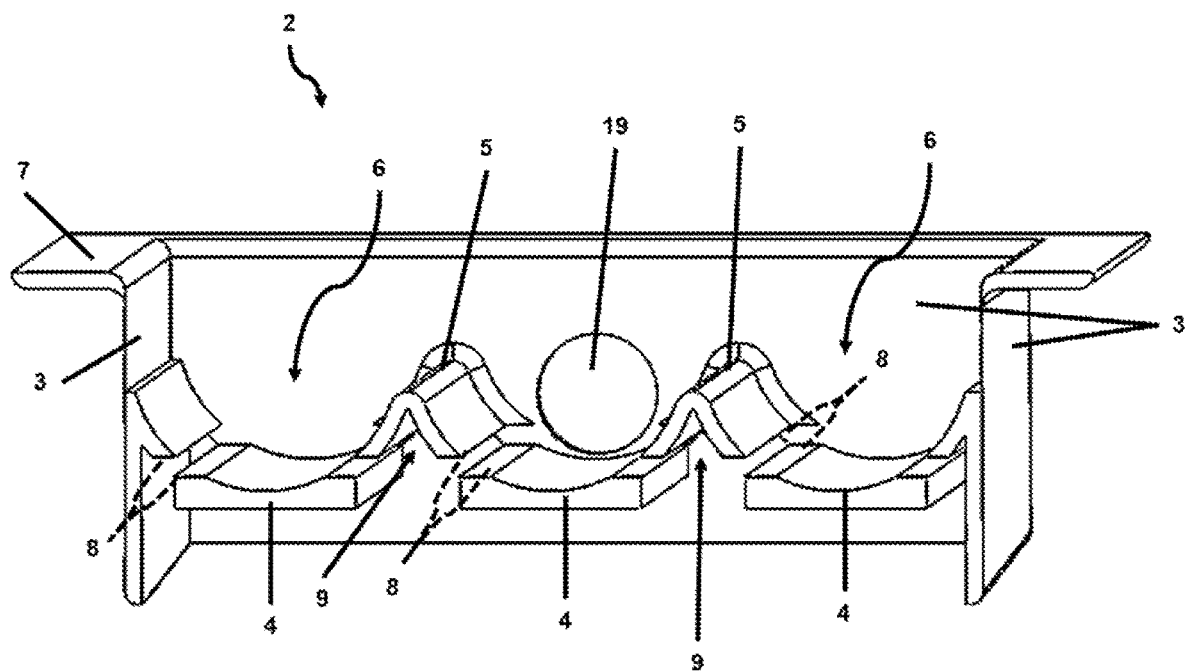
FIG. 2 is a perspective cross-sectional view of the modified chip tray container according to one implementation of the present invention, showing the cut-through passages.

Turning to FIGS. 1-8, one embodiment of the assembly of the present invention may be described. Generally speaking, the assembly 1 includes two main components: the measuring component (as shown in FIGS. 3-7) and the gaming piece container 2 (as shown in FIGS. 1-2). Each of these components is described more fully below. In one embodiment, the assembly 1 is manufactured as a single piece. In an alternative embodiment, however, the assembly 1 may be manufactured in separate pieces and later assembled for purchase or at the final location. In this particular embodiment, it may be seen that the measuring component (including both the sensors 13 and housing, referred to herein as a sensor rack 10) is removable from the gaming piece container 2 for maintenance or replacement, allowing for the gaming establishment to cost-effectively repair assemblies where sensors 13 have malfunctioned or where other damage has occurred.

As indicated, one of the main components of the assembly 1 is the gaming piece container 2. The gaming piece container 2 may take many forms, so long as the container 2 is a general holding container for individual gaming pieces. For purposes of describing the invention, the gaming piece container 2 may be described with reference to one particular application of the assembly 1. That is, it is contemplated that the assembly 1 would be particularly useful in the content of table games at a gaming establishment, where gaming chips or tokens are held in a tray on or within the gaming table. As such, the gaming piece container 2 may be described herein as a chip tray, with one embodiment of the gaming piece container shown as a chip tray in FIG. 1.

While it is understood that the gaming token container 2 can comprise any number of shapes, the preferred embodiment will be described with regard to a generally rectangular chip tray 2, as generally known in the art, with various novel modifications particular to the invention at hand. This preferred embodiment of the container 2 comprises four outer walls 3 that form the general rectangular profile of the container. A bottom surface 4 connects the four bottom edges of the outer walls 3 to form an internal storage area having a depth equal to the height of the outer walls 3. The internal storage area is divided into separate storage rows 6 by a number of internal dividing walls 5, such that the bottom surface 4 is separated into a number of separate bottom surfaces 4 associated with each of the separate storage rows 6 (as shown particularly in FIG. 2). Each of the separate bottom surfaces 4 (one per each row 6) preferably has an outward curvature that generally mirrors the rounded edges of the gaming tokens to be stored in the container 2. The internal dividing walls 5 are preferably spaced apart at a distance substantially equal to the diameter of a poker chip or other gaming token intended to be stored in the container 2. The container 2 preferably lacks a top surface so that the gaming tokens stored inside the container 2 are exposed from an overhead position, allowing the user to access the gaming tokens positioned inside the storage rows 6. Various gaming chip container embodiments are known in the art and the present invention is capable of being adaptively applied to any such embodiments.

For the intended use of the container 2, each storage row 6 is generally for use with gaming tokens of different values. For example, one row 6 may be for the storage of gaming tokens having a five dollar value (i.e. each token represents five dollars), the next row 6 may be for storage of ten dollar chips, the next row 6 may be for the storage of twenty five dollar chips, and so on. The value corresponding to each row 6 may be modified according to an electronic programmer or microprocessor (described below). A measuring system, as described below, is equipped onto the token container 2 and is used to measure the number of tokens in one or more of the rows 6 and/or in the entire container 2. The number of tokens in the whole container 2 may be recorded in addition to the number of tokens in each individual storage row 6. A display screen (not shown) is used to display the number of tokens measured, thereby allowing for an accurate real-time measurement of tokens entering and leaving the storage container 2. Alternatively, the monetary value of the tokens in the container 2 (or in each individual row 6 of the container 2) can be determined and displayed.

Figure 5:
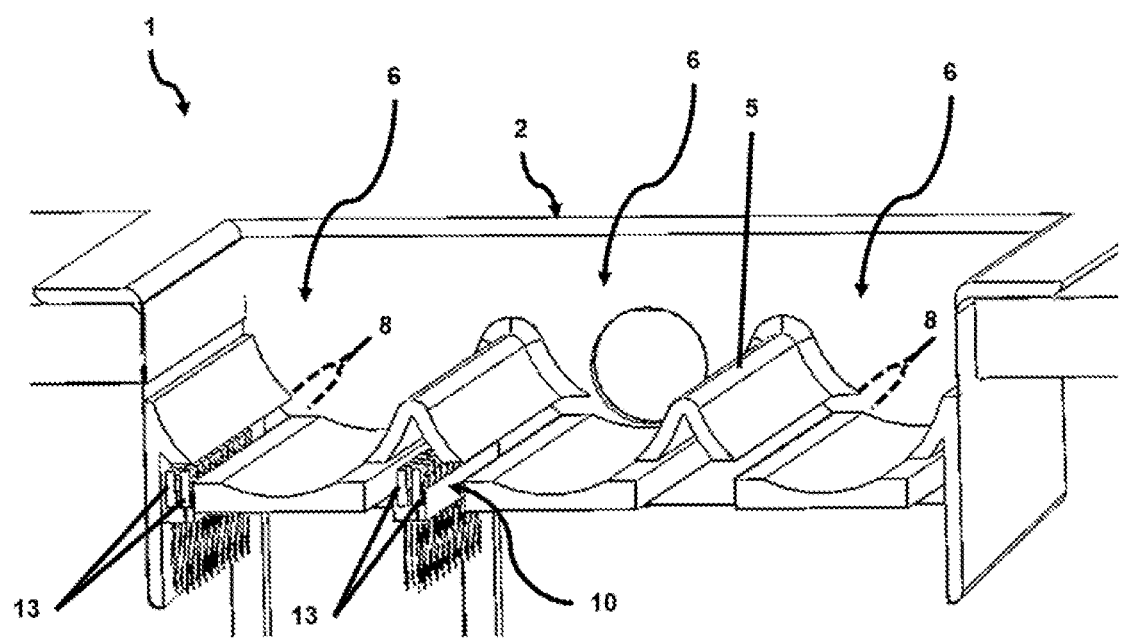
FIG. 5 is a perspective cross-sectional view of an implementation of the present invention, showing a series of sensors positioned in a sensor rack affixed under the chip tray container and aligning with the cut-through passages of a first row of the container.

In the preferred embodiment, which is particularly useful in the case where the measuring component uses an infrared sensor array, the measuring component (described below) is positioned or removably attachable to the underside of the gaming piece container 2 (as shown particularly in FIG. 5). While traditional gaming piece containers 2 (such as chip trays) have solid, continuous bottom surfaces, modifications must be made in order to allow the measuring component (particularly the sensors 13) to detect the number of gaming pieces in the container 2. As such, a pair of rectangular cross section pass through cut-outs 8 is positioned in the bottom surface 4 or bottom walls 5 of each row 6 in the container 2 (with each of the pair of cut outs 8 generally located on opposing sides of a particular row 6, such that a line-of-sight is created across bottom of each row 6, which can be seen more clearly in FIG. 6).

Figure 3:
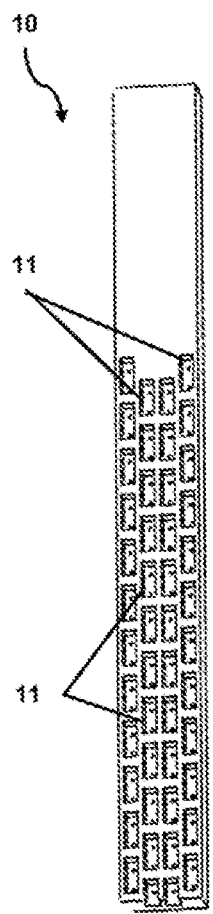
FIG. 3 is a top view of a sensor rack of the measuring component of one implementation of the present invention.
Figure 4:
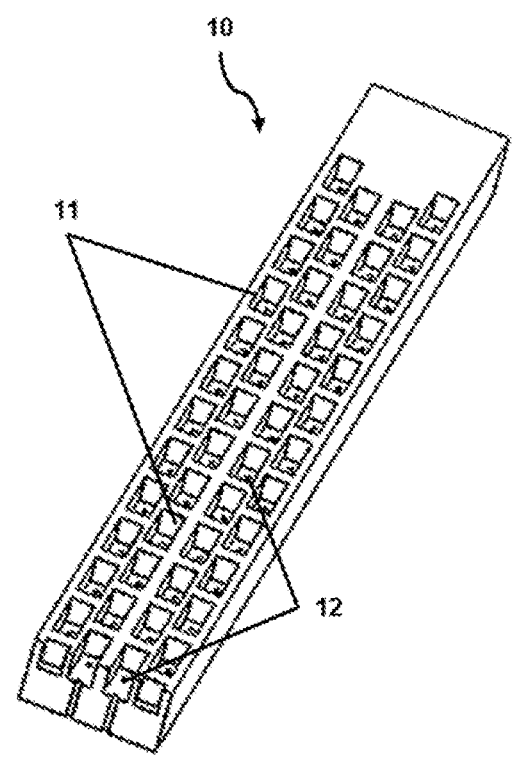
FIG. 4 is a top perspective view of the sensor rack of the measuring component of one implementation of the present invention.

A sensor rack 10 is utilized to affix the sensors 12 to the modified chip container 2. The sensor rack 10 is particularly useful when implemented with the infrared sensor 13 arrangement. In such a case, the sensor rack 10 is used to hold the infrared sensors 13 underneath the chip tray, as shown in FIG. 5. The preferred embodiment of the sensor rack, as shown in FIGS. 3-4, is a generally rectangular beam having a number of rectangular cavities 11 cut in a staggered pattern along the length of the beam. The cavities 11 are designed to hold the infrared sensors 13. As discussed more fully below, the sensor array (and, more particularly, a number of corresponding pairs of sensors positioned in corresponding cavities 11 across a chip tray row 6) is designed to detect whether chips are present in the particular row 6. As such, these cavities 11 (and thus the sensors 13 held in the cavities 11) must be spaced apart such that the sensors 13 are capable of detecting the presence of chips at the particular position where the pair of sensors 13 is located. As such, the sensors 13 must be placed such that the series of sensor pairs is spaced no farther apart than the thickness of the chip, token, or other gaming piece to be detected by the device (as to avoid any "dead spots" between sensors 13 where chips can be undetected). In the case of poker chips, the distance is preferably about 3 mm. In one embodiment, the cavities 11 are staggered (as shown in FIGS. 3-4) to allow for the center of the sensor pairs (i.e. the line of sight between the emitter and corresponding detector) to fit into the prescribed 3 mm spacing.

At the bottom of each cavity 11 is one or more through holes 12 to allow the leads of the sensors 13 to travel through the bottom surface of the sensor rack 10. In one embodiment, a separate sensor rack 10 is positioned on the bottom of the chip container 2 at every internal wall 5 (as shown in FIG. 5, where a first sensor rack is placed under the far left portion of the first row and a second sensor rack is placed under the first internal wall 5 on the right side of the first row), such that multiple sensor racks 10 are utilized. In an alternative embodiment, a single sensor rack 10 having the same general shape as the chip container 2 may be affixed such that the sensor rack 10 covers the entire bottom area of the chip container 2 (not shown). In this alternative embodiment, the cavities 11 in the sensor rack 10 are positioned in columns at spaced-apart locations on the sensor rack 10 corresponding to the positions of the internal dividing walls 5. Furthermore, the sensor racks 10 should be positioned such that the sensors 13 housed in the cavities 11 of the rack 10 can fit within the open peaks 9 between the chip rows (the peaks are identified particularly in FIG. 2). The sensor rack 10 is preferably easily removable and re-attachable to the chip container 2 such that the sensors 13 can be easily accessed for repair or replacement.

In one embodiment the sensor rack 10 is a singularly manufactured beam with rectangular cavities 11. Alternatively, the sensor rack 10 may be fabricated from two separate pieces—a top half and a bottom half, wherein the top half is a generally rectangular beam where the cavities 11 extend throughout the entire beam (therefore leaving no bottom surfaces on the cavities 11) and the bottom half is a planar surface having through holes 12, such that when the bottom half is affixed to the top half, the bottom half acts as the bottom surface of the sensor rack 10 and the through holes 12 in the bottom half align with the cavities 11 in the top half to create the compartments for receiving the infrared sensors 13. The sensor rack 10 may be manufactured with any durable material (such as metal, wood, or plastic) and in one embodiment may be the result of 3D printing.

Figure 6:
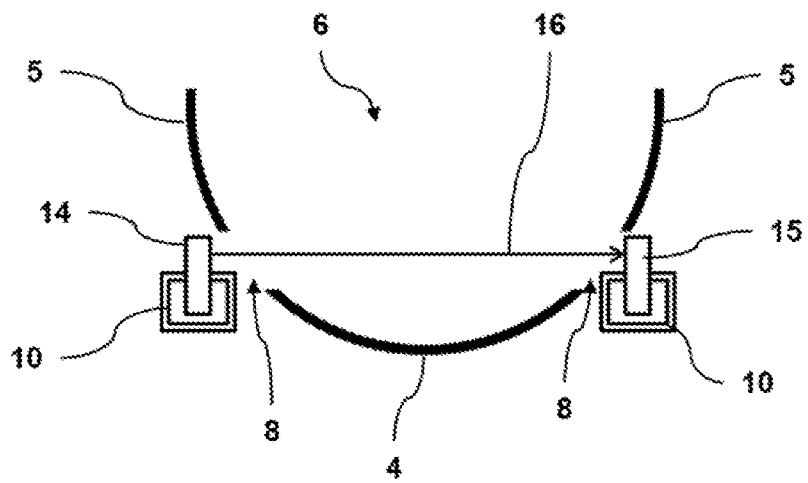
FIG. 6 is a schematic showing the functionality of a sensor pair with respect to one row of the chip tray container, where no chip is in the row and therefore the light emitted by an emitter sensor is detectable by a corresponding detector sensor, according to an implementation of the invention.
Figure 7:
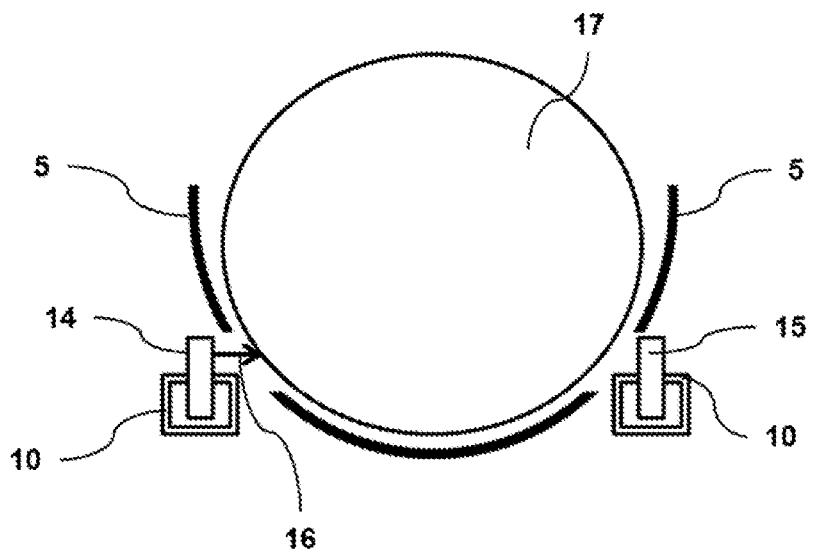
FIG. 7 is a schematic showing the functionality of a sensor pair with respect to one row of the chip tray container, where the emitted light is blocked by a chip in the row and therefore undetectable by the detector sensor, according to an implementation of the invention.

As indicated above, this particular sensor rack 10 assembly is particularly useful with the utilization of a measuring component including a number of infrared sensors 13 arranged in a sensor array. In the preferred embodiment, the sensor array 13 is made up of a number of infrared sensor pairs 14, 15—each of the sensor pairs 14, 15 having an infrared emitter 14 (a source of light energy) and an infrared detector 15 (a detector of light energy), as shown in FIGS. 6-7. The sensor pairs 14, 15 are designed such that light emitted from the infrared emitter 14 is configured to be detected across the row 6 by the corresponding infrared detector 15 (which is positioned across the chip row 6 from the emitter 14, as discussed more fully below). In the preferred embodiment, the infrared sensors 13 (both the emitters 14 and detectors 15) are side-looking sensors, meaning that each sensor's 13 functional side is only on one side of the sensor 13 (as opposed to multiple sides). Thus, the infrared emitter 14 will emit infrared light only from its singular functional side (the right side of the emitter 14 in FIGS. 6-7) and the infrared detector 15 will detect infrared light only on its singular functional side (the left side of the detector 15 in FIGS. 6-7). This allows an emitter 14 and corresponding detector 15 to be placed across the chip row 6 from one another (with their functional sides facing one another) so that the particular pair 14,15 is only emitting and detecting light associated with that chip row 6. This also allows for sensors 13 in between rows 6 to be placed back to back (the details of the particular arrangement discussed below with regard to FIG. 8), ultimately saving space and allowing for more sensors to be utilized.

Figure 8:
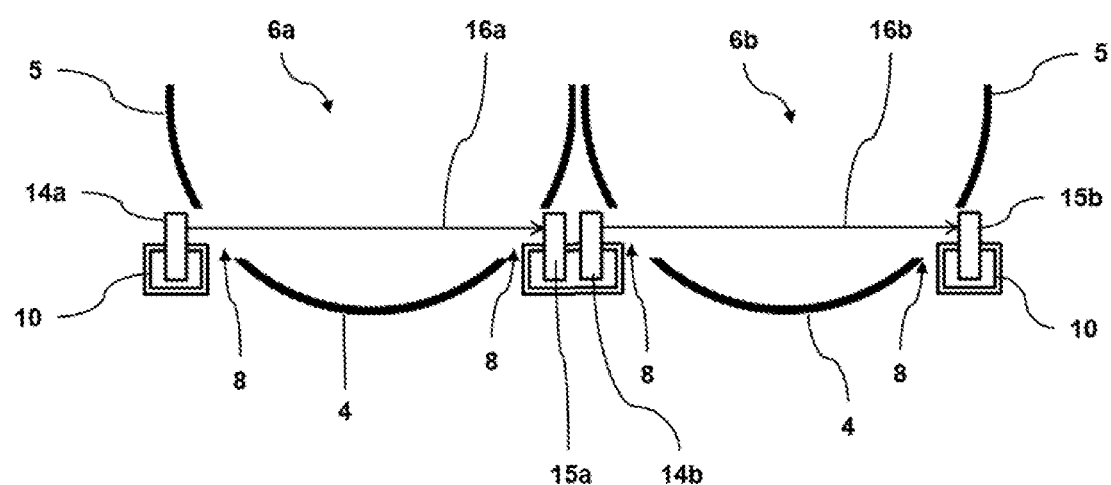
FIG. 8 is a schematic showing the functionality of a sensor pair with respect to two side-by-side rows of the chip tray container, according to an implementation of the invention.

Turning to FIG. 8, the particular arrangement of the sensor array within the sensor rack(s) 10 of the invention may be described more fully. As discussed above, the sensor rack 10 is preferably a generally rectangular beam having cavities 11 for holding individual sensors 13. In fact, each cavity 11 in the sensor rack 10 is configured to hold two non-corresponding sensors 15a, 14b (as shown in FIG. 8). That is, each cavity 11 is configured to hold a detector 15a and an emitter 14b (this particular set of detector 15a and emitter 14b not being corresponding with regard to functionality) in a back-to-back fashion such that the functional sides of the detector 15a and emitter 14b are facing away from one another. Each of these sensors 13 in a particular cavity 11 are designed to functionally correspond to different rows 6 on opposite sides of the cavity 11 and to functionally pair with a sensor 13 positioned in a corresponding cavity 11 across the particular row 6. For example, as shown in FIG. 8, Detector 15a positioned in one cavity (middle of FIG. 8, as shown in Rack 10) has a functional side for detecting light across Row 6a from Emitter 14a positioned in a corresponding cavity in a Rack 10. As shown, the same cavity in that Rack 10 also holds Emitter 14b, which is positioned back-to-back with Detector 15a such that the non-functional sides of Detector 15a and Emitter 14b are facing one another (and thus their functional sides are facing away from one another). Emitter 14b is positioned such that its functional side (light emitting side) faces Row 6b and is directed toward the functional side of its corresponding detector, Detector 15b, which is positioned across Row 6B in a corresponding cavity in the right-most Rack 10. It may be seen that this sort of arrangement is repeated in each cavity 11 along the entire length of each sensor rack 10, as shown in FIG. 5, in order to provide an array of sensors 13 capable of detecting chips (or no chips) along the entire length of the row 6 and for each row 6 in the tray. Infrared emitter 14 and detector 15 pairs such as those available from SparkFun are acceptable because they are side-looking sensors and their rectangular bodies allow for easier manufacturing of sensor rack 10 cavities 11, but other shaped sensors 13 or brand of sensors may be used.

In certain implementations, the invention may use one or more spacers in order to distinguish between different types of chips in a row 6. For example, it is a common practice in the casino industry to place lower-value chips in the rows 6 that are toward the outside of chip container 2, whereas higher value chips are placed in rows 6 toward the middle of chip container 2. For very high-value chips, the casino may place chips of two or more different values in the same row 6, with a number of spacers placed between the chips of different value to keep them separated. For example, a row 6 may have a certain number of $100 chips at the bottom of the row 6, then a set of five or so spacers, then a certain number of $500 chips above the $100 chips and spacers in that row 6. In order to address this practice, in certain implementations of the invention the spacer chips used are formed of a clear plastic or other clear material or open spaced material, such that the spacers do not visually block the path between sensor pairs (detector 15 and corresponding emitter 14). When the system detects that there is an "empty" (i.e., clear) series of chip positions between two sets of full positions, the system will know that this means that there are clear dividers in place separating chips of two different values. In this way, the system can keep track of the number and value of chips in a row 6, even in the case when the row 6 has chips of more than one value stacked together in the same row. Although a set of five spacers is used in one implementation because that is the common number used in casinos today for regular spacers, any number of spacers or size of spacers could be used in various implementations.

Having described the structure of assembly 1 having a measuring component (sensors 13 and rack 10) and chip container 2, the method of use may now be described. As indicated, each row 6 in the chip tray 2 is associated with a designated chip value. Furthermore, as discussed above, each row 6 in the chip tray 2 has a series of sensor pairs (detector 15 and corresponding emitter 14) positioned at spaced apart intervals along the length of the row 6. The emitter 14 of each sensor pair emits light across the row 6 toward its corresponding detector 15. If no chip is positioned within the line of sight of the sensor pair 14, 15 the light from the emitter 14 is detected by the detector 15, as shown in FIG. 6. If, on the other hand, there is a chip 17 in the row 6 at that location, the detector 15 will not detect any light (as the chip 17 will block the light from reaching the detector 15, as shown in FIG. 7). Thus, as chips 17 are moved in and out of the particular row 6, the sensor array 13 is capable of detecting how many total chips 17 are in the row 6 at a given time (based on whether chips are at the particular location corresponding to each sensor pair 14, 15). The sensors 13 are connected to an electrical circuit and power source and are also in communication with a microprocessor (not shown) which based off of the known chip value for a particular row 6 and the measured value of chips 17 in the row 6 by the sensor array 13, the total monetary value of chips 17 in the row 6 may be calculated. Where clear spacers are detected as described above, the microprocessor can determine the total chip value in a row 6 by knowing the denomination of the different chip types in front of and behind the spacer or spacers, and then calculating the total value based on the number of each chip denomination. Thus the number of chips in a particular row 6 at any time is determined and the monetary value of chips in the row 6 is also determined. Based on this information for each row 6, the number and value of chips in the entire tray 2 (and therefore at that entire table game) can be known. As game play in action and chips are removed or added to the tray 2, the sum total of the amount located within the case/tray 2 is updated.

The information recorded (i.e. the number of chips or total value of chips in the container 2) is then sent to a display location. The display location may vary depending on the desired use. For example, a display screen (not shown) may be integrated into the chip tray 2 and the recorded total for that particular chip tray 2 can be displayed right on the chip tray 2 itself. Alternatively, the display location may be at the table associated with the chip tray 2 but not directly integrated into the chip tray 2. In either event, this display can be a single display screen, there can be a separate display screen for each individual chip row, or a combination of individual screens and an overall screen can be used. Alternatively, the recorded information can be transmitted via a network to a separate location in the gaming area—like a table or desk where security personnel is located. In this case, a single computer may, for example, have access to the recorded information from each individual gaming table using a chip tray assembly 1. It is also contemplated that the information can be sent through computer networks to a location remote from the casino, thus allowing multiple casinos to be monitored from a single remote location. Finally, it is understood that these types of displays can be used individually or in combination to provide for a more overarching monitoring scheme. The recorded information could also be transmitted wirelessly and world-wide through the Internet if desired. In one embodiment, the display is a screen or other device that displays the number of chips or values in a numerical display.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A system for holding and monitoring a plurality of gaming tokens, the system comprising:
   a. a container comprising a plurality of walls defining an outer periphery of the container;
   b. a base connecting the plurality of walls, thereby creating a storage compartment inside the container;

c. a plurality of dividing panels positioned inside the storage compartment, wherein the plurality of dividing panels are configured to separate the storage compartment into a plurality of rows, wherein each of the plurality of rows is configured to receive a number of the plurality of gaming tokens;

d. a measurement device affixed to the container, wherein the measurement device comprises a series of sensor pairs corresponding to each of the plurality of rows, the sensor pairs for each of the plurality of rows being positioned at spaced-apart detection positions along each of the plurality of rows, further wherein each of the sensor pairs for each of the plurality of rows comprises an emitter positioned on a first side of each of the plurality of rows and a detector positioned on a second side of each of the plurality of rows, wherein each emitter of each sensor pair is configured to emit a signal across one of the plurality of rows to each detector of each sensor pair, and wherein each detector is configured to detect a receipt or a non-receipt of the emitted signal and determine at least one of (a) a presence of one of the plurality of gaming tokens at the detection position based on determining the non-receipt of the emitted signal and (b) an absence of one of the plurality of gaming tokens at the detection position based on determining the receipt of the emitted signal, further wherein the measurement device comprises a first removable sensor rack on the first side of each of the plurality of rows and a second removable sensor rack on the second side of each of the plurality of rows, further wherein the second side is opposite the first side, further wherein the first removable sensor rack for a particular row is configured to hold the emitter of each sensor pair for the particular row and wherein the second removable sensor rack for the particular row is configured to hold the detector of each sensor pair for the particular row; and e. a microprocessor coupled to the measurement device, the microprocessor configured to determine for each of the plurality of rows a count of the plurality of gaming tokens positioned in each row and a total monetary value associated with the count of the plurality of gaming tokens in each row.

2. The system of claim 1, wherein for each of the sensor pairs, the emitter comprises an infrared emitter configured to emit infrared light signals and the detector comprises an infrared detector configured to detect the infrared light signals.

3. The system of claim 1, wherein the first removable sensor rack for a first of the plurality of rows comprises a first plurality of cavities configured to receive the emitters of the series of sensor pairs corresponding to the first of the plurality of rows.

4. The system of claim 3, wherein the second removable sensor rack for the first of the plurality of rows comprises a second plurality of cavities, and wherein the second plurality of cavities in the second removable sensor rack is configured to receive the detectors of the series of sensor pairs corresponding to the first of the plurality of rows.

5. The system of claim 1, wherein the sensor pairs are positioned at spaced apart detection positions of 3 mm between each sensor pair.

6. The system of claim 1, further comprising a display device coupled to the microprocessor, wherein the display device is configured to display at least one of the count of the plurality of gaming tokens positioned in each of the plurality of rows and the total monetary value associated with the count of the plurality of gaming tokens in each of the plurality of rows.

7. The system of claim 6, wherein the display device is a video screen that visibly displays either or both of the count of the plurality of gaming tokens positioned in each of the plurality of rows and the total monetary value associated with the count of the plurality of gaming tokens in each of the plurality of rows.

8. The system of claim 1, further wherein the microprocessor is configured to determine, based on the count of the plurality of gaming tokens positioned in each of the plurality of rows, a total number of gaming tokens positioned in the container.

9. The system of claim 8, further wherein the microprocessor is configured to determine, based on the total monetary value associated with the count of the plurality of gaming tokens positioned in each of the plurality of rows, a total monetary value of the total number of gaming tokens positioned in the container.

10. The system of claim 1, further wherein the microprocessor is configured to detect clear spacers between two sets of gaming tokens of different denomination in a single row of the plurality of rows, and calculate a total value of gaming tokens positioned in such single row in order to calculate a total monetary value of a total number of gaming tokens positioned in the container.

11. A system for holding and monitoring a plurality of gaming tokens, the system comprising:

a. a tray having a plurality of rows, wherein each of the plurality of rows is configured to hold a number of the plurality of gaming tokens;

b. a measuring system coupled to the tray and configured to monitor the number of the plurality of gaming tokens in each of the plurality of rows, the measuring system comprising:

i. a plurality of measurement sensor groups, each of the measurement sensor groups configured to determine the number of the plurality of gaming tokens in a particular row corresponding to the particular measurement sensor group, wherein each of the measurement sensor groups comprises a plurality of emitters and a plurality of detectors, wherein each of the plurality of emitters is configured to emit a signal across the particular row and wherein each of the plurality of detectors is configured to determine a presence or an absence of a gaming token from the plurality of gaming tokens based on a receipt or a non-receipt of the signal;

ii. a first removable sensor rack configured to hold the plurality of emitters on a first side of each of the plurality of rows and a second removable sensor rack to hold the plurality of detectors on a second side of each of the plurality of rows, further wherein the first side is opposite the first side, further wherein the first removable sensor rack for a particular row is configured to hold the emitter of each sensor pair for the particular row and wherein the second removable sensor rack for the particular row is configured to hold the detector of each sensor pair for the particular row, thereby positioning the plurality of emitters for each row of the plurality of rows opposite the plurality of detectors for each row of the plurality of rows;

iii. at least one display device configured to display at least one of the number of the plurality of gaming tokens in each of the plurality of rows and a sum total of the plurality of gaming tokens in the plurality of rows; and iv. a processor in communication with the plurality of measurement sensor groups and the at least one display device, wherein the processor is configured to calculate the sum total of the plurality of gaming tokens in the plurality of rows and communicate at least one of the sum total of the plurality of gaming tokens and the number of the plurality of gaming tokens in each of the plurality of rows from the plurality of measurement sensor groups to the at least one display device.

12. The system of claim 11, wherein each of the measurement sensor groups comprises a plurality of infrared sensor pairs, each of the infrared sensor pairs comprising one of the plurality of emitters and one of the plurality of detectors.

13. A system for monitoring a sum total of gaming tokens, the system comprising:

a. a plurality of containers, wherein each of the plurality of containers comprises a portion of the sum total of gaming tokens, further wherein each of the containers comprises a plurality of rows, wherein each of the plurality of rows is configured to hold a number of gaming tokens;

b. a plurality of measurement devices, wherein each measurement device is positioned at one of the plurality of rows of one of the plurality of containers and is pointed across such one of the plurality of rows to determine the number of gaming tokens in such one of the plurality of rows of the plurality of containers, further wherein each measurement device comprises a series of measurement pairs, each of said measurement pairs comprising an emitter positioned on a first side of such one of the plurality of rows of the plurality of containers associated with the measurement device and configured to emit a signal across such one of the plurality of rows of the plurality of containers toward a detector positioned opposite such one of the plurality of rows of the plurality of containers, wherein the detector is configured to detect one of a receipt of the signal and a non-receipt of the signal, wherein the detector is configured to indicate an absence of a gaming token if the signal is received by the detector or a presence of a gaming token if the signal is not received by the detector, further wherein each measurement device comprises a first removable sensor rack having a plurality of cavities configured to hold the emitter of each measurement pair on a first side of such one of the plurality of rows of the plurality of containers and a second removable sensor rack having a plurality of cavities configured to hold the detector of each measurement pair on a second side of such one of the plurality of rows of the plurality of containers;

c. a microprocessor configured to separately record the number of gaming tokens in each of the plurality of rows of each of the plurality of containers and a total number of gaming tokens in all of the plurality of containers; and d. at least one display device in communication with the microprocessor, wherein the at least one display device is configured to display at least one of the number of gaming tokens in each of the plurality of rows of each of the plurality of containers and the total number of gaming tokens in all of the plurality of containers.

14. The system of claim 13, wherein each of the plurality of measurement devices comprises a plurality of infrared emitters and a plurality of infrared detectors arranged in a series of infrared sensor pairs, each of the infrared sensor pairs comprising one of the plurality of infrared emitters and one of the plurality of infrared detectors.

15. The system of claim 13, wherein the microprocessor is further configured to identify one or more spacers in a row of a container between gaming tokens of differing value by determining that a first infrared sensor pair does not detect a gaming token in one or more positions between positions at which a second infrared sensor pair does detect a gaming token, and to calculate a total value of all gaming tokens in the row based on the number of gaming tokens in front of the one or more spacers and behind the one or more spacers.

* * * * *